TRANSMISSION SYSTEMS EMPLOYING QUANTIZATION

Filed April 26, 1954 3 Sheets-Sheet 1

INVENTOR
C. C. CUTLER
BY Arthur J. Torsiglieri
ATTORNEY

INVENTOR
C. C. CUTLER
BY Arthur J. Torsiglieri
ATTORNEY

March 8, 1960 C. C. CUTLER 2,927,962

TRANSMISSION SYSTEMS EMPLOYING QUANTIZATION

Filed April 26, 1954 3 Sheets-Sheet 3

INVENTOR
C. C. CUTLER
BY Arthur J. Torsiglieri
ATTORNEY

United States Patent Office 2,927,962

Patented Mar. 8, 1960

2,927,962

TRANSMISSION SYSTEMS EMPLOYING QUANTIZATION

Cassius C. Cutler, Gillette, N.J., assignor to Bell Telephone Laboratories, Incorporated, New York, N.Y., a corporation of New York Application April 26, 1954, Serial No. 425,485

6 Claims. (Cl. 178—43.5)

This invention relates to pulse transmission systems and more particularly to quantization in such systems.

Quantization is a process whereby the instantaneous amplitude of successive samples of a signal wave which may have any of a continuous range of values is represented as the nearest one of an arbitrarily chosen number of specific amplitude levels. It finds use in some of the recently developed communication systems which are designed to minimize the effect of noise in the transmission path. In such systems, it is the practice to sample periodically the message wave and to quantize successive samples to specific amplitude levels. Because of the exact nature of the quantized signal samples, they can be regenerated exactly at successive repeater stations along the transmission path, so long as the accumulation of noise and distortion between successive regenerations is kept sufficiently small so as not to obliterate the quantized levels. Moreover, by each successive exact regeneration, there is eliminated the noise and distortion which has been acquired since the last regeneration. As a result, transmission over long distances can be effected with a minimum accumulation of noise and distortion.

However, the process of quantizing itself results in an error in the reproduced signal which has much the character of noise. Although this quantizing error can in theory be reduced to any desired minimum by increasing the number of the quantizing levels and decreasing the size of the quanta in the quantization process, as a practical matter there is a limit, since increasing the number of quantizing levels increases the complexity of the terminal equipment and decreasing the size of the quanta increases the signal's vulnerability to noise and distortion.

The primary object of the present invention is to reduce, in systems which employ quantization, the effect of quantizing errors without increasing the number of quantizing levels or decreasing the size of the quanta.

To this end, an important feature of the invention is an arrangement for the reintroduction at the transmitter of the error associated with the quantization of any one sample into the succeeding sample with reversed polarity before the quantization of the latter. In effect, this amounts to modifying each signal sample in a manner to compensate for the error associated with the quantization of the immediately preceding sample. The result of compensation in this manner is that there is little D.-C. error in the reproduced signal, the power-frequency spectrum of the quantizing error sloping upward with increasing frequency. Although the total error power is unaffected by this process, the error power is now concentrated at a high frequency end of the spectrum. By sampling at a high enough rate, the greater part of the error power can be concentrated at frequencies above the signal band, so that by suitable filtering there can be derived at the receiving terminal a reproduced signal which is a more exact replica of the original message wave.

The principles of the invention can be embodied advantageously in any of the various systems which employ quantization. By way of example and for purposes of illustration, the invention will be described with specific reference to some simple forms of better known systems.

The invention will be understood more fully from the following more detailed description taken in conjunction with the accompanying drawings in which.

Figure 1:
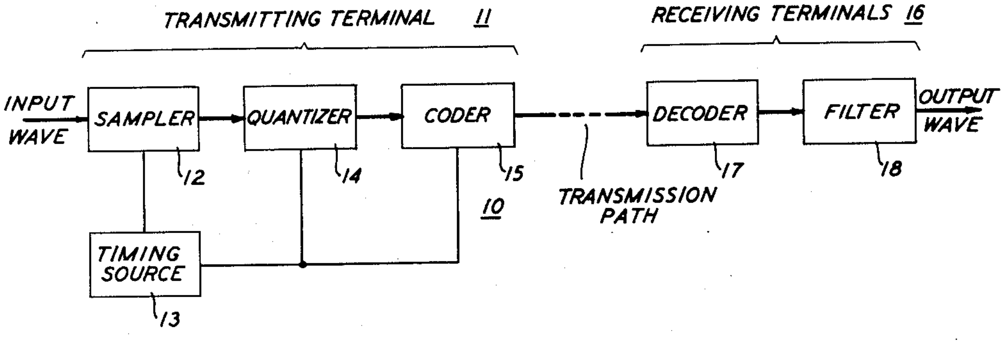
Fig. 1 shows the basic elements of a pulse code modulation transmission system, of a kind known hitherto, which utilizes quantization of the signal wave.

With reference now more particularly to the drawings, Fig. 1 shows the essential elements of a pulse code modulation transmission system 10 of the kind described in the Bell System Technical Journal, vol. 27, pp. 1–57 (1948). Throughout the drawings, it will be convenient to employ blocks to indicate apparatus for performing specified operations on signals applied thereto. For increased clarity of exposition, a separate block will be used to represent each operation, although, as will be evident to workers in the art, in some instances a single specific element, or circuit, can readily be adapted to perform two or more of the individual operations. Moreover, since each of the functions called for can readily be performed by a variety of circuits well known to workers in the art, it is deemed unnecessary to include a detailed circuit schematic of any apparatus.

At the transmitting terminal 11, the input wave is supplied to a sampler 12 which periodically samples the message wave under the control of the timing pulses provided by a synchronizing timing source 13. The sampler 12 is advantageously electronic in nature and may, for example, be of the kind described on page 27 of the aforementioned Bell System Technical Journal volume. The sampling interval chosen is generally related to the frequency bandwidth of the message wave and advantageously is equal to the Nyquist interval characteristic of the message wave, where the Nyquist interval is defined as $1/2W$ where W is the frequency bandwidth of the message wave. As is well known to workers in the communications art, a continuous message wave may be transmitted without loss of information by transmitting successive samples thereof taken at intervals no greater than Nyguist intervals, i.e. by sampling at a rate equal to twice the frequency bandwidth of the signal.

As will be discussed in detail hereinafter, in the practice of the present invention it is advantageous to sample at intervals less than the Nyquist interval to localize the error power at frequencies higher than will be needed to be recovered to provid a true replica of the message wave, which high frequencies will be eliminated by suitable filtering action so as not to appear in the reproduced message wave.

The successive samples are supplied to a quantizer 14 where the amplitude of the sample is translated into the nearest one of a fixed number of quantizing levels under control of timing pulses provided by the timing source 13. The number of quantizing levels utilized is a matter of choice. The larger the number of quantizing levels, the higher the potential fidelity of the reproduced signal but the more complex the equipment. For use in a pulse code modulation system, the number of quantizing levels is related to the number of pulse digits to be used in the code and the nature of the code. For example, for use with a five digit binary pulse code, $2^5$ or 32 quantizing levels will be needed.

The quantizer 14 can take a wide variety of forms. For example, the quantizing operation can be integrated with the coding operation if there is employed a coding tube with a quantizing grid, of the kind described on page 47 of the aforementioned Bell System Technical Journal volume. Moreover, it can be appreciated that the effect of first quantizing and coding with such a tube and thereafter decoding in the manner described on page 36 of the same volume is to provided a quantized output. Alternatively, where it is preferred to quantize without simultaneously coding there may be employed a quantizing tube of the kind described in copending application Serial No. 299,644 filed July 18, 1952, by A. M. Clogston and C. W. Harrison, now Patent 2,776,371, issued January 1, 1957.

The successive quantized samples are thereafter coded in a suitable code. As indicated above, the funotion of coder 15 can, for example, be combined with that of quantizer 14 to provide a binary pulse code output. Alternatively, binary pulse coding may be achieved by an arrangement of the kind described in United States Patent 2,449,467 which issued on September 14, 1948, to W. M. Goodall.

The coded pulses thereafter are applied to suitable transmitting equipment (not shown) for eventual reception by a receiving terminal 16 where the message wave is reconstituted for utilization. The receiving terminal includes suitable equipment (not shown) for receiving the transmitted pulses and amplifying them preliminary to application to a decoder 17. The decoder 17, for example, can be of the form described on page 36 of the aforementioned volume and serves to reform the message wave from the succession of transmitted pulses. Finally, the reformed wave is passed through a lowpass filter to eliminate extraneous high frequency components in the reformed wave.

There has been described in connection with Fig. 1 the basic elements forming a pulse code modulation system. In practice, it is usually advantageous further to include in such a system equipment to emphasize or deemphasize the amplitude response and to equalize the frequency response, but such equipment is here omitted for reasons of simplicity.

Figure 2:
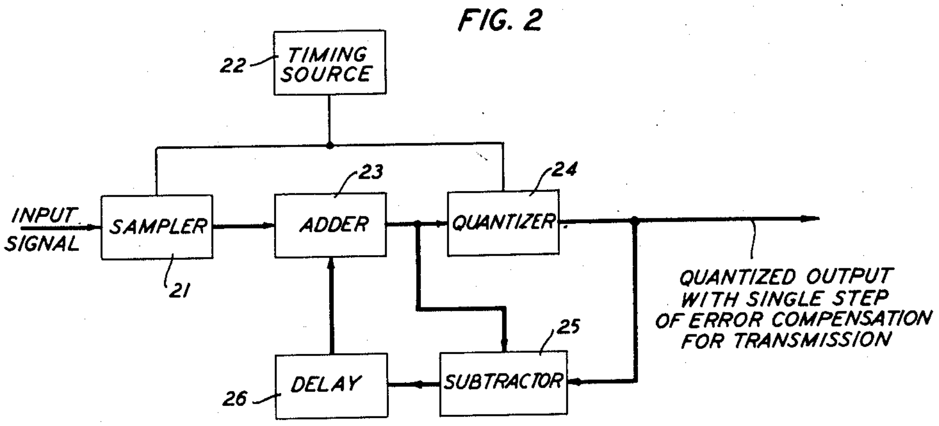
Figs. 2 and 3 illustrate, in block schematic form, the principal elements of transmitting terminals utilizing, respectively, one and two steps of error compensation in accordance with the characteristic feature of the invention, for use in a transmission system of the kind shown in Fig. 1.

As has been discussed above, the quantizing process introduces errors in the reproduced signal which may be treated as noise. The present invention is directed primarily in reducing such quantizing noise by a process of error compensation. Fig. 2 shows the application of error compensation principles to a transmitting terminal of the kind shown in Fig. 1.

The input message wave is first supplied to a sampler 21 which periodically samples the message wave under the control of synchronizing pulses provided by the timing source 22. The sampler 21 may be of the same kind used in the arrangement shown in Fig. 1, although it is advantageous to sample at a rate faster than twice the highest signal frequency so that the quantizing noise power may be concentrated at frequencies higher than those necessary to keep for recovering all of the intelligence in the message wave. The successive samples are supplied to an adder 23 which, for example, can be an amplifier of the kind described in United States Patent 2,541,276 which issued on February 13, 1951, to B. M. Oliver arranged to provide an output whose amplitude is the sum of the amplitudes of two input signals. The adder 23 adds to each successive sample supplied thereto from the sampler 21 the quantizing error associated with the quantization of the immediately preceding sample as previously modified by the action of the adder. The output samples from the adder are supplied to the quantizer 24 for quantization. The number of quantizing levels employed is still a matter of choice; the same considerations are applicable here as would be applicable in the absence of error compensation. It is feasible, of course, to utilize the potential reduction in quantizing noise made possible by error compensation to permit operation with fewer quantizing levels and larger size quanta to effect a reduction in the width of the frequency band which needs to be transmitted.

To provide error compensation in accordance with the invention, it is necessary to have a measure of the quantizing error. To this end, the subtractor 24 is employed to compare the amplitude of each unquantized sample supplied by the adder 23 to the quantizer 24 with its corresponding quantized value which results as the output of the quantizer 24 and derive the difference or quantizing error. The subtractor 25 can take any of various forms. It may, for example, be an amplifier of the kind described in the aforementioned B. M. Oliver patent arranged to provide the appropriate difference output. Alternatively, the quantizer 24 itself may be of such a form as to make available as another output the residue of the quantization process so that the function of the subtractor 25 is integrated with that of the quantizer 24.

It is, of course, important to synchronize the arrival of the quantized and unquantized samples in the subtractor 25. If the quantizer adds an appreciable delay to samples traversing therethrough delay equalization before subtraction is desirable. However, in the interest of simplicity it is being assumed throughout that each of the elements shown functions in a negligibly short interval of time.

For assuring the right polarities for use by the adder 23, the subtractor 25 is arranged to provide a positive amplitude when the amplitude of the unquantized sample exceeds its quantized value. Alternatively, if the subtractor 25 is arranged to provide a negative amplitude when the amplitude of the unquantized sample exceeds its quantized value, the adder 23 may be replaced by a circuit which subtracts the negative amplitude supplied from the input sample amplitude.

So that the compensating error signal associated with any given sample will appear at the adder 23 at the same time as the immediately succeeding sample, it is necessary to arrange that travel around the loop comprising the quantizer 24 and the subtractor 25 results in a delay of one sampling interval. This is shown schematically in Fig. 2 by the insertion of a delay element 26 in the loop.

The performance of the arrangement described in Fig. 2 can be illustrated by a symbolical representation of the signal and errors. It will be convenient to utilize the upper case letters A, B, C, etc., to represent the amplitudes of the successive samples provided to the adder 23, and the lower case letters $a$, $b$, $c$, etc., to represent successive associated errors in the quantizer 24. In the absence of any error compensation, the amplitudes $A+a$, $B+b$, $C+c$, etc., are transmitted which in the receiving terminal result in the original signal plus a noise-like error voltage $a$, $b$, $c$, etc.

Considering now the arrangement shown in Fig. 2, if the error signals $a$, $b$, $c$, etc., are derived and introduced in the incoming signal path with a delay of one sampling interval and reversal of sign the quantizing errors appear twice in the output, but with opposite polarity. The incoming signal A, B, C, etc., gets error components subtracted successively by the action of the adder 23 and the output therefrom is A, $B-a$, $C-b$, etc. This signal in turn after passage through the quantizer becomes $A+a$, $B-a+b$, $C-b+c$, etc., which signal is transmitted. At the receiving terminal there results the original signal plus a noise-like error voltage $a$, $b-a$, $c-b$, etc. Since it can be assumed that the individual error components are not correlated, the peak value of the reproduced error voltage has twice the peak value and $\sqrt{2}$ times the root mean square value of the uncompensated system. However, this is more than made up for, because the spectral distribution of the error power is now predominantly at the high frequency end of the band, and low frequency components of the error power are considerably reduced. By utilizing a sampling rate in excess of that required for the uncompensated system and filtering out at the receiving terminal the extraneous frequency components corresponding to the region of high quantizing error power, an appreciable increase in the fidelity of the reproduced signal can be achieved.

The process of feeding back the error signal to achieve error compensation can be repeated additional times, subject to certain limitations to be described more fully below. Each additional step of error compensation provides a further reduction in the low frequency error components at the expense of high frequency components.

Figure 3:
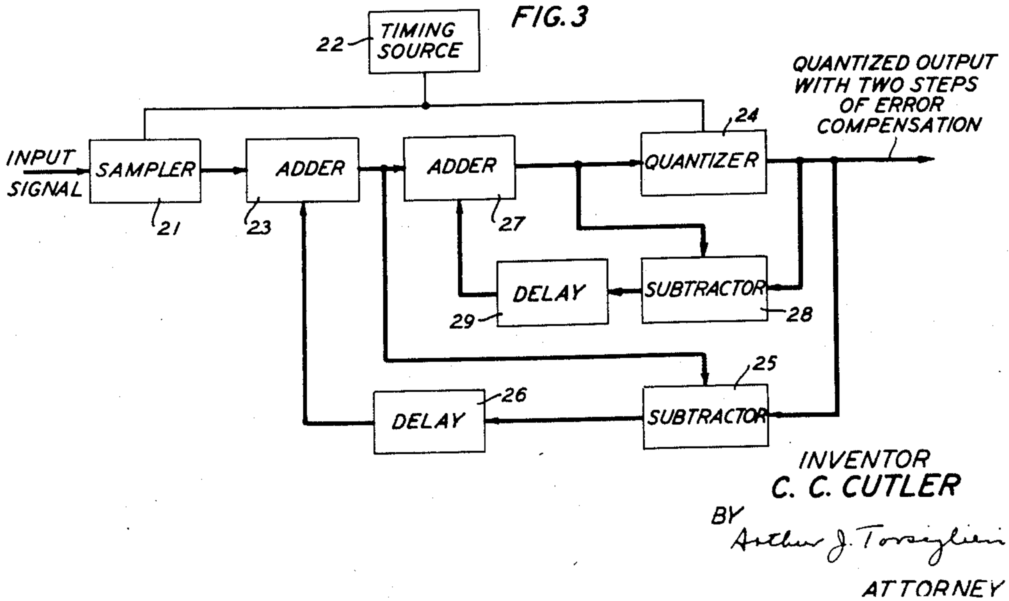

By way of example to illustrate the manner in which additional steps of error compensation may be secured, Fig. 3 shows an arrangement incorporating two steps of error compensation. It can be seen that this arrangement differs from that shown in Fig. 2 by the inclusion of a second feedback path for the quantizing error from the output side of the quantizer back to the incoming signal path. It will be convenient to designate elements in this circuit arrangement which have counterparts in the arrangement shown in Fig. 2 by the same reference numerals used for such counterparts. Accordingly, in addition to the feedback path formed by the subtractor 25 and delay element 26 between the output side of the quantizer 24 and the adder 23, there is inserted intermediate between the adder 23 and the quantizer 24 a second adder 27 for combining therein the output of the first adder 23 and the quantizing error of appropriate polarity provided by the subtractor 28 which compares the quantized value provided by the quantizer 24 with the unquantized amplitude level supplied by the adder 27 to the quantizer 24. There is also inserted in this path a delay element 29 to provide that the error voltage fed back appears at the adder 27 at the time of the immediately succeeding sample. Similarly, by including additional adders in the incoming signal path for adding to each incoming sample the error associated with the quantization of the sample immediately preceding it, as modified by the previous action of the adder, further error compensation can be realized.

Figure 4:
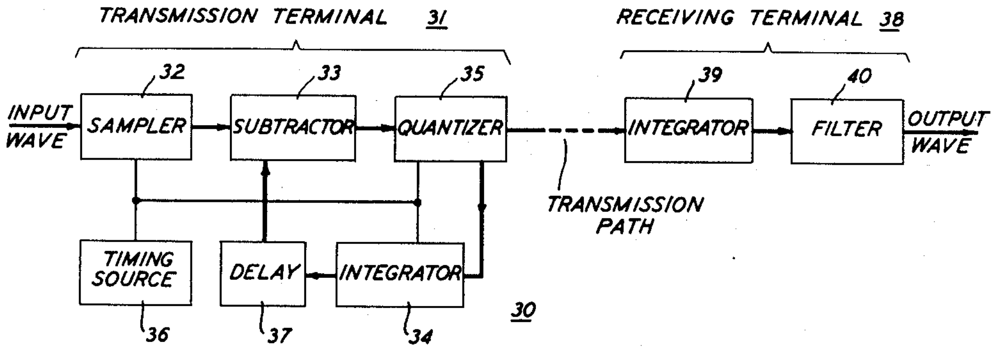
Fig. 4 shows the basic elements of a differential quantization transmission system of a kind known hitherto.

The principles of the invention find special application in a differential quantization system in which essentially there is quantization of the rate of change of the amplitude level. Fig. 4 illustrates the basic elements of a differential quantization system of the kind described in my United States Patent 2,605,361 which issued to me on July 7, 1952.

Straightforward quantization systems of the kind described in Fig. 1 are not affected by a complete excursion of the signal from extremes in amplitude in one sampling interval. However, few signals require all this capacity, and none do if the sampling interval is less than the Nyquist interval, i.e., if the sampling rate is greater than twice the highest signal frequency. By quantizing the rate of change in signal amplitude rather than the signal amplitude, a differential quantization system achieves enhanced efficiency of transmission in proportion to the rates of the maximum signal amplitude to the maximum signal slope measured in units of the sampling interval. Such enhanced efficiency can be utilized either to provide improved performance with the same number of quantizing levels and the same size quanta or equivalent performance with fewer quantizing levels and increased size quanta.

In the differential quantization system 30 shown in Fig. 4, at the transmitting terminal 31 the input message wave is applied initially to a sampler 32 which samples at a rate higher than twice the highest frequency in the signal band. Each successive sample is applied to a subtractor 33 which subtracts from each sample value the amplitude of the voltage stored on an integrator 34, and the output of the subtractor is supplied to the quantizer 35 for quantization. The successive quantized samples provided by the quantizer 35, in addition to being utilized for transmission, usually after coding, are supplied to the integrator 34 which accumulates the quantized values without appreciable leakage. For this purpose, the integrator 34 may be simply a storing capacitance with little leakage whose stored charge is either added to or subtracted from by the quantized samples provided by the quantizer 35. The integrator 34 applies under the control of the timing pulses provided by the timing source 26 which also synchronizes the operation of the sampler 32 and the quantizer 35, a voltage for use in the subtractor 33. As will be explained in greater detail below, the voltage applied is found to be simply the quantized value of the last sample. The time delay in the feedback path comprising the quantizer 35 and the integrator 34 is adjusted by delay element 37 which is also in the path so that the integrator output is applied to the subtractor 33 at the same time as the next succeeding sample.

In effect, such an arrangement operates to provide for transmission the quantized value of the difference of the amplitude of each successive input sample and the quantized value of its immediately preceding sample. The differential quantized amplitude derived can be coded into a binary pulse code for transmission, or alternatively, can be utilized to modulate correspondingly a carrier wave.

Moreover, in the limiting case of differential quantization of this kind there is utilized a quantizer characterized by only two quantizing levels. A differential quantization system of this kind which uses only two amplitude levels is now generally termed a "deltamodulation" system. In a deltamodulation system there is generally employed a sampling rate considerably higher than twice the highest frequency in the signal and the quantizer functions as a two-position electronic switch. The general principles of deltamodulation are described in an article published in March 1952 in Phillips Technical Review, vol. 9, pages 237. In deltamodulation, the two-level quantized output pulses are advantageously transmitted as a series of pulses and spaces in the manner characteristic of a binary code in a pulse code modulation system.

At the receiving terminal 38 the transmitted pulses after reception are applied to an integrator 39 which functions in the manner of integrator 34 at the transmitting terminal to store the successive received pulses without leakage and provides at each instant the quantized value of the corresponding sample of the message wave. If the transmitted pulses are sent in a coded form it is, of course, necessary to decode such pulses before use by the integrator 39. The output of the integrator 39 is passed through a low pass filter 40 which removes the extraneous high frequency components.

It will be convenient to analyze this differential quantization system in the same way that the error compensation arrangement of Fig. 2 was analyzed. Suppose that successive signal samples are represented by A, B, C, etc., and that the corresponding quantizing errors are represented by *a*, *b*, *c*, etc. Then it can be seen that the successive subtractor outputs will be A, B—A—*a*, C—B—*b*+*c*, etc., the corresponding quantizer outputs will be *A*+*a*, *B*—*A*—*a*+*b*, *C*—*B*—*b*+*c*, etc.; and the corresponding integrator outputs will be *A*+*a*, *B*+*b*, *C*+*c*, etc., which it can be seen are the quantized values of the original signal samples and will also be the signal replica reproduced by integrator 39 at the receiving terminal. Accordingly, the reproduced noise will be *a, b, c,* etc.

Figure 5:
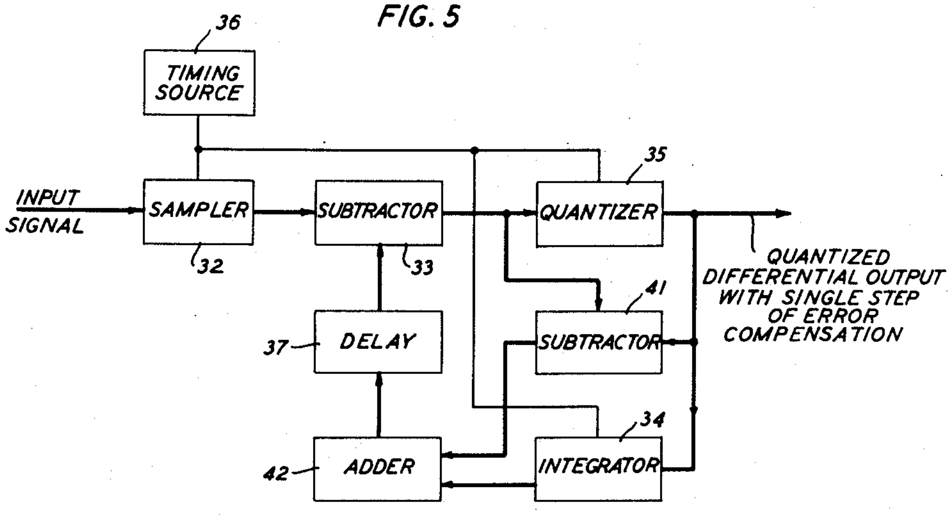
Fig. 5 illustrates how the transmitting terminal of the system shown in Fig. 4 can be modified to include a step of error compensation in accordance with the invention.

In the arrangement shown in Fig. 5, a single step of error compensation in accordance with the invention is incorporated in the transmitting terminal circuitry of a differential quantization system. To point up only the differences which must be made in the basic differential quantization arrangement to adapt it for error compensation, the elements in this arrangement corresponding to elements of the basic differential quantization arrangement shown in Fig. 4 have been given the same reference numerals as their counterparts.

The quantizing error is derived in the usual manner by means of subtractor 41 wherein there is derived the difference of the unquantized sample value applied as an input to the quantizer 35 from the subtractor 33 and the quantized value provided as the output of quantizer 35. This difference is combined in the adder 42 with the value provided by the integrator 34, and the resultant, after being suitably delayed by means of delay 37, is supplied to the subtractor at the time of arrival there of the next succeeding sample from the sampler 32.

As indicated above, by utilizing in a differential quantizing system a quantizer which has only two quantizing levels, there results the basic arrangement of deltamodulation. Accordingly, the arrangement shown in Fig. 5 is applicable to deltamodulation if the quantizer 35 is arranged to provide only two levels of quantization and the sampling rate is made suitably high.

The performance of a differential quantization arrangement including one step of error compensation can be analyzed in the manner used above. Let A, B, C, etc. be the successive signal amplitudes, and *a, b, c,* etc. the successive quantizing errors. The first sample A will be unaffected by the subtractor 33 and will be quantized in quantizer 35 to a value $A+a$. This value $A+a$ will be stored by the integrator 34. The subtractor 41 will derive the quantizing error $a$. The adder 42 will then provide an output $A+2a$ which is supplied to the subtractor 33 in time to be subtracted from the succeeding sample B. As a result, the value $B-A-2a$ is next supplied to the quantizer 35 which provides therefrom a quantized output $B-A-2a+b$. This in turn is supplied to the integrator which thereafter will have stored thereon a value $B-a+b$ which is added to the last quantizing error $b$ in the adder 42 to provide a value $B-a+2b$ to be subtracted from the succeeding sample C. The next quantized sample output will, accordingly, be $C-B+a-2b+c$. After this is stored on the integrator, its stored value becomes $C+c-b$. As has been indicated above in a differential system the stored values on the integrator at the transmitting terminal represent the signal replica which will be reproduced by the identical integrator at the receiving terminal. Accordingly, it can be seen that the reproduced quantizing error will have values $a$, $b-a$, $c-b$, etc. Again, this makes it possible to localize the error power in frequencies higher than those in the signal band by using an elevated sampling rate and filtering out extraneous frequencies.

As is pointed out in my aforementioned patent and in the Phillips Technical Revied article, a second step of differentiating can be included in differential quantization systems to form what are described as double differential or double integration systems. The principles of the invention can similarly be applied to such systems to reduce the effects of quantizing errors.

Moreover, as is described in my application Serial No. 171,219 filed June 29, 1950, now Patent No. 2,724,740, issued November 22, 1955, a differential quantization system can be modified to include variable quantization. Such variable quantization accommodates the size of the quanta to the amplitude of the signal being quantized. In a differential system, the differential signal is effectively the signal. When the differential signal is of small amplitude level, small size quanta are advantageously used to minimize the size of the possible quantizing error. When the differential signal is of large amplitude level, large size quanta are used, large quantizing errors being more tolerable when the amplitude level is high.

Figure 6:
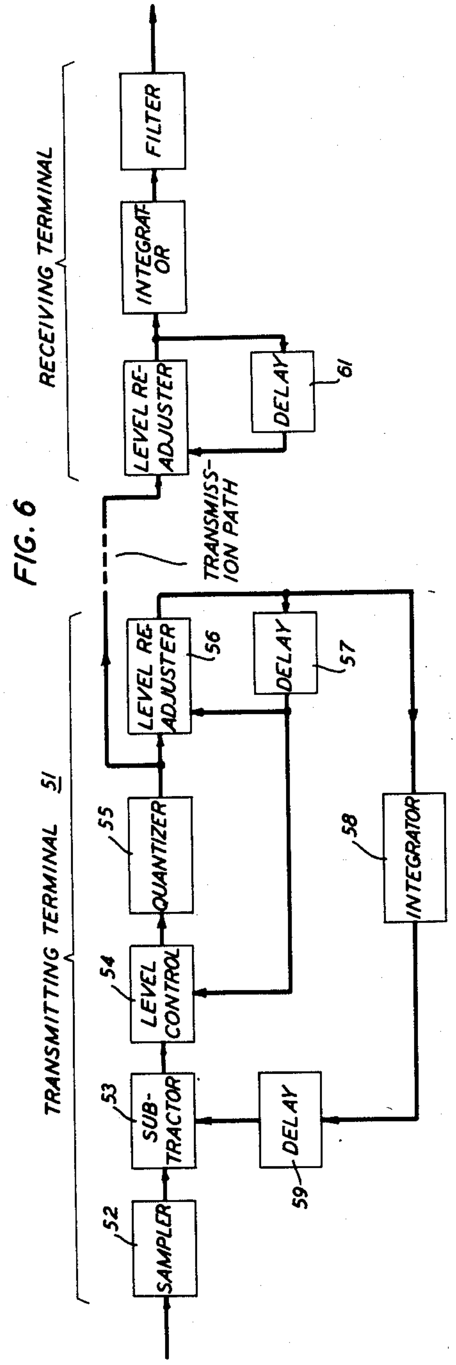
Fig. 6 shows the basic elements of a variably-quantized differential transmission system of a kind known hitherto.

Fig. 6 shows a variable quantization differential system 50 of the kind described in my aforementioned application. At the transmitting terminal 51 the input wave is sampled by the sampler 52 and the successive samples are applied to a subtractor 53. The subtractor 53 operates in the manner of the subtractor 33 in the differential quantization system 30 shown in Fig. 4 to provide a differential output. To this end, a feedback path which includes the integrator 58, functioning in the manner of integrator 34 in the differential quantization system 30, and a delay element 59 is used to apply to the subtractor 53 the quantized amplitude of the preceding sample for use in deriving a differential output. For increased simplicity, there is omitted in this figure the timing source which provides the timing pulses for properly synchronizing the operation of the various elements. The distinctive characteristic of a variable quantization arrangement is the inclusion in the incoming signal path at a point before quantization of a level control circuit 54, which is essentially a variable gain amplifier whose gain for each successive differential sample applied thereto is determined by the quantized amplitude value of the immediately preceding differential sample which is also supplied thereto for control purposes. To derive the quantized amplitude value of the immediately preceding differential sample, the variably quantized differential output provided by the quantizer 55 in addition to being transmitted (usually after coding) is also supplied to a level readjusting circuit 56 which merely deemphasizes the emphasis provided by level control 54. To this end, the readjusting circuit 56 similarly comprises a variable gain amplifier whose gain for each sample applied as an input thereto is determined inversely by the same value used to control the gain of the level control circuit 54. The inclusion of delay element 57 merely insures the proper synchronization of the arrival of the gain control pulse with that of the input differential sample whose level is being affected.

At the receiving terminal 59, the transmitted variably quantized differential samples first have their levels readjusted by circuit 60 which functions in the manner of level readjusting circuit 56 to compensate for the action of level control circuit 54. To this end, delay element 61 makes it possible to feed back, for gain control purposes, the preceding quantized differential sample. The quantized differential samples recovered are then supplied in turn to integrator 62 and filter 63 which function in the manner of integrator 39 and filter 40 at the receiving terminal 38 of differential quantization system 30 shown in Fig. 4.

Figure 7:
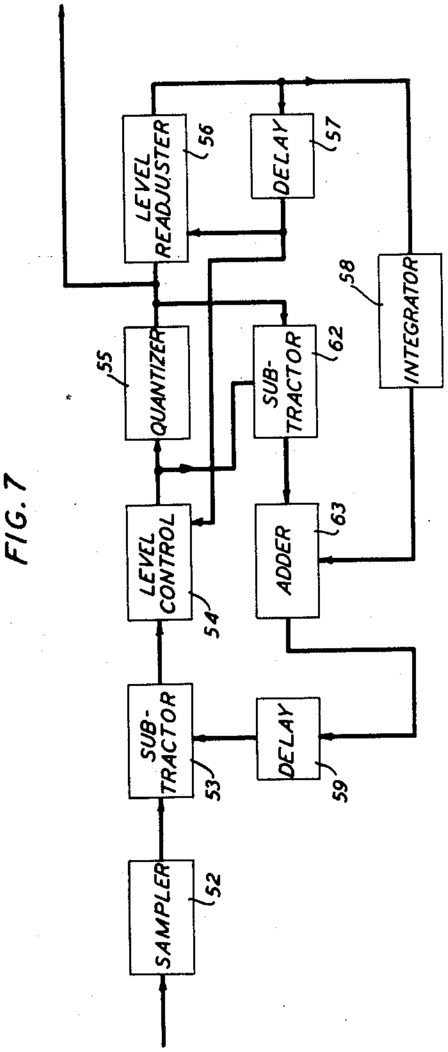
Fig. 7 illustrates how the transmitting terminal of the system shown in Fig. 6 can be modified to include a step of error compensation in accordance with the invention.

Fig. 7 shows how the transmitting terminal of the variably quantized differential system shown in Fig. 6 can be modified to include a step of quantizing error compensation. To highlight only the additions necessary, there have been used to designate the counterparts of elements shown in the system of Fig. 6 the same reference numerals as used for the counterparts. To achieved error compensation, it is necessary to derive the quantizing error, which, as shown, may be derived by comparing in the subtractor 62 the amplitude of the sample applied as an input to the quantizer 55 with the corresponding output therefrom. This quantizing error is combined in the adder 63 with the integrated value provided by the integrator 58 and the resultant after delay is used by the subtractor 53 in deriving the differential sample to be applied to the level control circuit 54. It can be seen that error compensation is achieved here in a manner analogous to that used in the error compensated quantized differential arrangement shown in Fig. 5.

There has been described above in connection with Figs. 2, 5 and 7 how one step of compensation for quantizing errors can be achieved in some better-known systems which employ quantization. Additionally, there has been described in connection with Fig. 3 the basic principles applicable to achieving more steps of error compensation. These principles are applicable to each of the systems described. In some instances, however, it may be advantageous to take precautions against instability effects which may arise when too many steps of error compensation are tried. Instability problems tend to become more serious the fewer the number of quantizing levels used, being most serious for the two level quantization characteristic of deltamodulation. Stability can be improved in arrangements which employ a number of error compensation steps by weighting each of the error compensating components, before their use to modify the input sample, as by the inclusion of attenuation in its associated feedback path. Moreover, systems employing variable quantization of the kind described generally are less susceptible to instability.

It is to be understood that the specific embodiments described are merely illustrative of the general principles of the invention. Various arrangements may be devised by one skilled in the communications art without departing from the spirit and scope of the present invention.

What is claimed is:

1. In a transmission system which employs quantization of successive samples of the message wave, an arrangement to reduce the effect of quantizing errors comprising means for combining in turn each of successive samples of the input wave with the quantizing error associated with the immediately preceding sample for providing error-compensated samples, means supplied with the successive error-compensated samples for quantizing said samples and providing quantized error-compensated samples, means for deriving the successive quantizing errors associated with the quantization of the error-compensated samples, and means for supplying said successive errors to said first mentioned means for forming the error-compensated samples.

2. In a transmission system which employs quantization, sampling means supplied with an input message wave for deriving successive samples of said input message wave, combining means supplied with the successive message samples and the successive quantizing errors associated with the quantization of the immediately preceding sample for providing successively error-compensated samples, quantizing means supplied with the error-compensated samples for providing quantized samples, and means for comparing the amplitude value of each sample before and after quantization for deriving the quantizing error for use by the combining means.

3. In a transmission system which employs quantization, quantizing means to which is applied a series of signal samples for quantization, means for deriving the successive errors associated with the quantization of successive samples of said signal, and means for combining each of said successive errors in reverse polarity with the immediately succeeding sample before it is applied to said quantizing means.

4. A method for reducing the effect of quantizing errors in transmission systems which employ quantization which comprises sampling the message wave to derive a succession of message samples, modifying each successive message wave sample to compensate for the error in the quantization of the immediately preceding sample, quantizing the successive compensated samples, and deriving the error associated with the quantization of successive compensated samples for use in compensating succeeding samples.

5. In a transmission system which employs differential quantization of successive samples of the message wave, an arrangement to reduce the effect of quantizing errors comprising means for deriving the differential of successive samples of the input wave, means for combining in turn each of the successive differential signals with the error associated with the quantization of the immediately preceding differential signal for providing error-compensated differential signals, quantizing means applied with the successive differential error-compensated signals for providing quantized error-compensated differential signals, means for deriving the successive quantizing errors associated with the quantization of the error-compensated differential signals, and means for supplying said successive errors to said combining means for forming the error-compensated differential signals.

6. In a transmission system which employs differential quantization, sampling means supplied with an input message wave for deriving successive samples of said message wave, means supplied with the successive samples for providing successive differential signals, combining means supplied at each instant with a differential signal and the error associated with the quantization of the immediately preceding differential signal, quantizing means applied with the output of the combining means for providing quantized differential signals, and means for comparing the amplitude of each differential signal before and after quantization for deriving the quantizing error to be supplied to the combining means.

References Cited in the file of this patent

UNITED STATES PATENTS

| | | |
|---|---|---|
| 2,516,587 | Peterson | July 25, 1950 |
| 2,617,879 | Sziklai | Nov. 11, 1952 |
| 2,664,462 | Bedford et al. | Dec. 29, 1953 |
| 2,759,998 | Labin et al. | Aug. 21, 1956 |